US012590832B2

(12) United States Patent
Kano

(10) Patent No.: US 12,590,832 B2
(45) Date of Patent: Mar. 31, 2026

(54) SEAT STATE SENSING DEVICE, COMPUTER-READABLE RECORDING MEDIUM RECORDING A PROGRAM, AND SEAT STATE SENSING METHOD

(71) Applicant: Panasonic Intellectual Property Corporation of America, Torrance, CA (US)

(72) Inventor: Hiroyuki Kano, Hyogo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 445 days.

(21) Appl. No.: 18/226,999

(22) Filed: Jul. 27, 2023

(65) Prior Publication Data

US 2023/0366728 A1 Nov. 16, 2023

Related U.S. Application Data

(63) Continuation of application No. PCT/JP2021/046713, filed on Dec. 17, 2021.

(30) Foreign Application Priority Data

Jan. 29, 2021 (JP) ................................ 2021-013647

(51) Int. Cl.
G01H 17/00 (2006.01)
B60N 2/02 (2006.01)
B60N 2/90 (2018.01)

(52) U.S. Cl.
CPC .......... *G01H 17/00* (2013.01); *B60N 2/0272* (2023.08); *B60N 2/90* (2018.02)

(58) Field of Classification Search
CPC ...... G10K 1/00–2210/512; G01H 1/00–17/00; H04R 1/00–2499/15;

(Continued)

(56) References Cited

U.S. PATENT DOCUMENTS 7,511,833 B2 * 3/2009 Breed ..................... E05F 15/70
356/614

FOREIGN PATENT DOCUMENTS

DE 102020213007 A1 * 4/2022 .......... B60N 2/0276
JP 05-213142 8/1993

(Continued)

OTHER PUBLICATIONS

International Search Report (ISR) from International Searching Authority (Japan Patent Office) in International Pat. Appl. No. PCT/JP2021/046713, dated Feb. 15, 2022, together with an English language translation.

*Primary Examiner* — Judy Nguyen
*Assistant Examiner* — James Split
(74) *Attorney, Agent, or Firm* — GREENBLUM & BERNSTEIN, P.L.C.

(57) ABSTRACT

A seat state sensing device includes a first vibration detector that is installed in a seat of a vehicle, detects vibration, and outputs a first vibration signal, a second vibration detector that is installed in a vehicle body near the seat, detects vibration, and outputs a second vibration signal, a first calculation unit that calculates a similarity between the first vibration signal input from the first vibration detector and the second vibration signal input from the second vibration detector, and a sensing unit that senses a seat state including at least one of a slide position of the seat in a front-rear direction of the vehicle body, a reclining angle of the seat, and an orientation of the seat with respect to the front-rear direction of the vehicle body, based on the similarity calculated by the first calculation unit.

11 Claims, 10 Drawing Sheets

(58) Field of Classification Search
CPC . B60N 2/00–995; G01S 1/00–2205/10; G01B
1/00–2290/70
See application file for complete search history.

(56)                References Cited

FOREIGN PATENT DOCUMENTS

| JP | 08-216824   | 8/1996  |
| JP | 10-157619   | 6/1998  |
| JP | 2008-149922 | 7/2008  |
| JP | 2010-054962 | 3/2010  |
| JP | 2013-052850 | 3/2013  |
| JP | 2014-201174 | 10/2014 |

* cited by examiner

Figure 2:
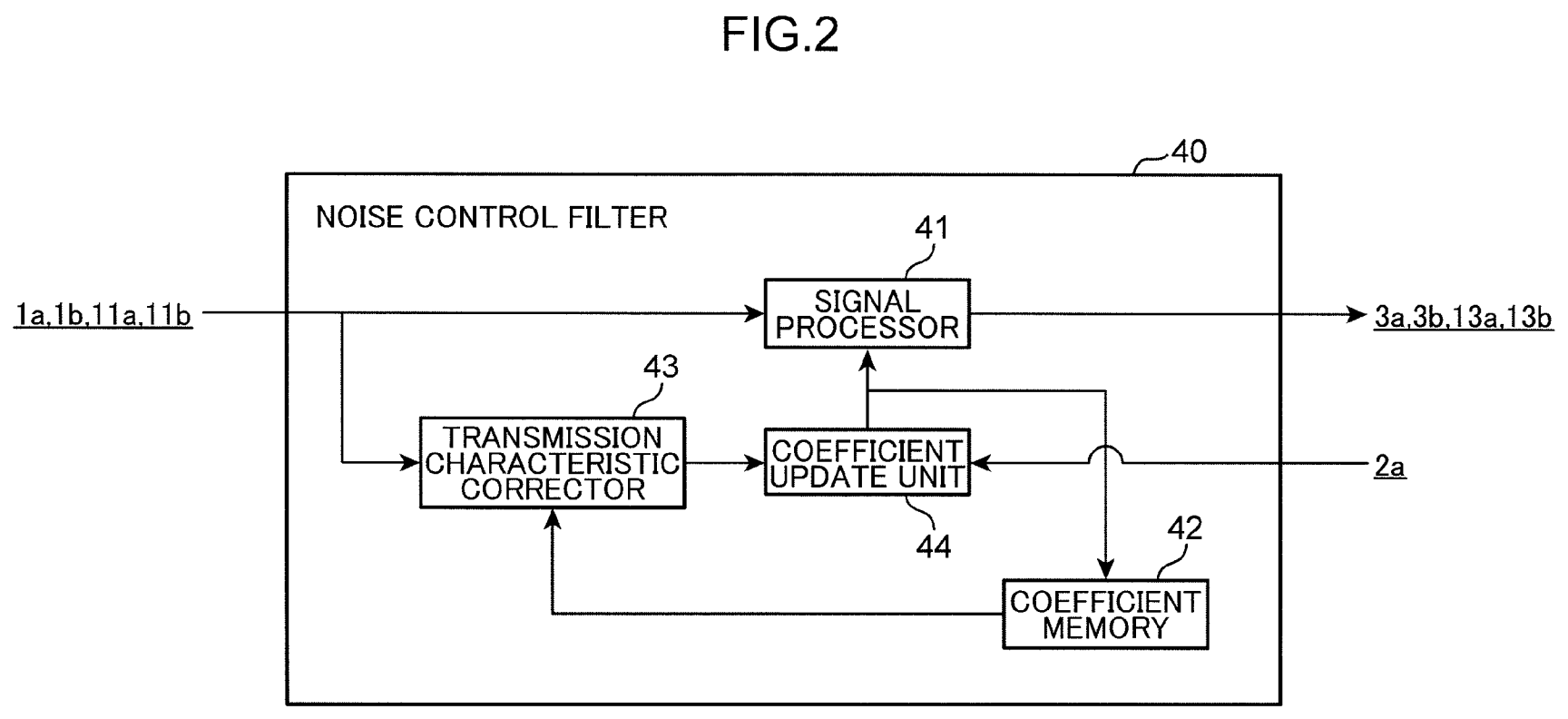

NOISE CONTROL FILTER

40

1a,1b,11a,11b 3a,3b,13a,13b

2a

41 SIGNAL PROCESSOR

43 TRANSMISSION CHARACTERISTIC CORRECTOR

44 COEFFICIENT UPDATE UNIT

42 COEFFICIENT MEMORY

TRAVELING DIRECTION

SEAT STATE SENSING DEVICE, COMPUTER-READABLE RECORDING MEDIUM RECORDING A PROGRAM, AND SEAT STATE SENSING METHOD

TECHNICAL FIELD

The present disclosure relates to a seat state sensing device, a computer-readable recording medium recording a program, and a seat state sensing method for automatically sensing a seat state, such as a seat orientation and a reclining angle in transportation means, such as an automobile, a train, an aircraft, or a ship, having a seat on which a passenger is seated.

BACKGROUND ART

Patent Literature 1 below discloses a system capable of urging an appropriate driving posture in accordance with a physique of a driver.

Patent Literature 2 below discloses a seat having a seat heater that gives a comfortable thermal sensation to a seated person in accordance with a reclining state of the seat.

Patent Literature 3 below discloses a device that appropriately deploys an airbag in accordance with a seating position that varies with a physique, a driving posture, or the like of an individual passenger.

Patent Literature 4 below discloses an airbag device that appropriately deploys an airbag by discriminating between a passenger seated on a seat and luggage placed on the seat.

Patent Literature 5 below discloses an active vibration and noise control (ANC) device that appropriately controls an in-vehicle noise even if a seat position or a reclining angle changes.

Patent Literature 6 below discloses sensing means that senses a seat on which a passenger is seated and a noise control filter efficiently controls a noise only at that position.

Patent Literature 7 below discloses a train seat orientation changing device that facilitates work for orienting all seats in a certain direction at the time of a turnaround operation or cleaning, thus shortening the work time.

As disclosed in Patent Literature 1 to 7, the seat state sensing according to the background art commonly uses a method for directly measuring a physical quantity related to a seat such as a seat position, an angle, a load, and a distance, but does not use an element not directly related to the seat itself.

CITATION LIST

Patent Literature

Patent Literature 1: JP 2014-201174 A
Patent Literature 2: JP 2013-52850 A
Patent Literature 3: JP H5-213142 A
Patent Literature 4: JP H8-216824 A
Patent Literature 5: JP 2008-149922 A
Patent Literature 6: JP 2010-54962 A
Patent Literature 7: JP H10-157619 A

SUMMARY OF INVENTION

An object of the present disclosure is to provide a seat state sensing device capable of sensing a seat state such as a seat slide position, a reclining angle, or a seat orientation at low cost using a vibration signal of a vehicle.

A seat state sensing device according to one aspect of the present disclosure includes at least one first vibration detector that is installed in at least one seat of a vehicle, detects vibration, and outputs a first vibration signal, at least one second vibration detector that is installed in a vehicle body near the at least one seat, detects vibration, and outputs a second vibration signal, a first calculation unit that calculates a similarity between the first vibration signal input from the at least one first vibration detector and the second vibration signal input from the at least one second vibration detector, and a sensing unit that senses a seat state including at least one of a slide position of the at least one seat in a front-rear direction of the vehicle body, a reclining angle of the at least one seat, and an orientation of the at least one seat with respect to the front-rear direction of the vehicle body, based on the similarity calculated by the first calculation unit.

BRIEF DESCRIPTION OF DRAWINGS

FIG. 1 is a configuration diagram of a seat state sensing device according to a first embodiment.

FIG. 2 is a configuration diagram of a noise control filter.

FIG. 5 is a side view of the driver's seat.

Figure 3:
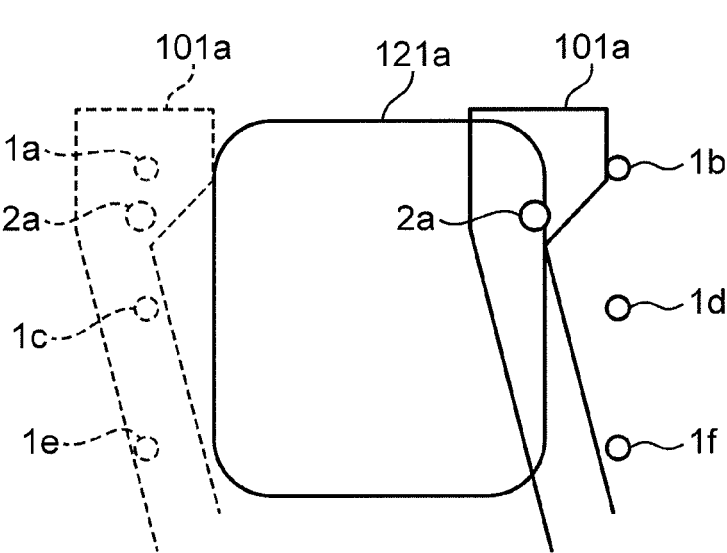
FIG. 3 is a side view of a driver's seat.
Figure 3:
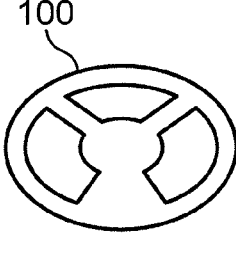

DESCRIPTION OF EMBODIMENTS (Knowledge Underlying Present Disclosure)

Many transportation means having seats are present, but in particular, it is premised that all passengers are seated in an automobile, and thus various controls in accordance with respective seated states of the passengers have been proposed.

For example, Patent Literature 1 discloses a system capable of urging an appropriate driving posture in accordance with a physique of a driver, and a camera is used as means that achieves this system. Specifically, a physique (sitting height) of the driver, a reclining angle of the driver's seat, and a slide amount of the driver's seat are obtained from an image captured by the camera in the vehicle interior, and the driver's seat is controlled in accordance with recommended values of the driver's seat reclining angle and slide amount appropriate for the physique.

Next, Patent Literature 2 discloses a seat having a seat heater that gives a comfortable thermal sensation to a seated person in accordance with a reclining state of the seat, and an angle sensor that detects a tilt of a seat back (seat backrest portion) is used as means that achieves this comfort. Specifically, when the angle sensor installed in the seat detects the tilt angle of the seat back and determines that the angle deviates from the standard position and the degree of intimate contact between the seat and the body of the seated person decreases, an appropriate thermal sensation is given to the seated person by increasing the amount of heat generated by the seat heater. Alternatively, in a case where the tilt angle is great (in a state where the seat back is greatly tilted backward) as in full reclining, a determination is made that the seated person is in a relaxed state, and the seat heater is set to a low temperature so that the seated person can have a pleasant sleep or not to suffer a low-temperature burn. Here, examples of the angle sensor include a variable resistor and a rotary encoder, or a position sensor and a gyro sensor.

Next, Patent Literature 3 discloses a device that appropriately deploys an airbag in accordance with a seating position that differs with individual passengers, such as a physique and a driving posture. As means for achieving the device, seat position detection means that detects a slide position of a seat and seat back angle detection means that detects a rotation angle of the seat back are used. Specifically, a passenger head position is estimated from information detected by the seat position detection means and the seat back angle detection means, and an airbag deployment condition level is increased or decreased in accordance with the estimated value. More specifically, in a case where the head position is close to a steering (steering wheel), the air bag is set to be easily deployed. Here, a contact type is exemplified as the seat position detection means and the seat back angle detection means.

Patent Literature 4 also discloses an airbag device that appropriately deploys an airbag by discriminating between a passenger seated on a seat and luggage placed on the seat. As means for achieving this, seat position detection means that detects the position of the seat in a vehicle front-rear direction, seat back angle detection means that detects the tilt angle of a seat back, and distance measurement means that measures the distance between the means and the passenger or the seat back are used. Specifically, the distance between the seat back and a reference point (the position where the distance measurement means is installed) is obtained from the detection values of the seat position detection means and the seat back angle detection means, and the presence or absence of a passenger in the seat is determined based on the difference between the calculated value and the distance value directly measured by the distance measurement means. Thus, the deployment timing, speed, and the like of the airbag are controlled. Furthermore, the necessity of the airbag deployment is also controlled by distinguishing between a passenger and luggage. Here, examples of the seat position detection means and the seat back angle detection means include a seat back angle sensor and seat position sensor including a potentiometer (variable resistor), and an example of the distance measurement means includes an ultrasonic sensor.

Next, Patent Literature 5 discloses an active vibration and noise control (ANC) device that appropriately controls an in-vehicle noise even if a seat position and a reclining angle change. As means that achieves this, detection means that detects a seat position that means a vehicle front-rear direction or a vehicle vertical direction, or a seat back angle is used. Specifically, based on the seat position detected by a position sensor and the seat back angle detected by an angle sensor, a transmission characteristic, which is set in correction means, between a speaker reproduces a cancellation sound for a noise and a microphone that detects an error signal between the cancellation sound and the noise is switched to an appropriate characteristic. Thus, a coefficient of an adaptive filter that outputs a control signal for canceling the noise can be appropriately obtained. Here, a variable resistor is exemplified as the position sensor and the angle sensor.

Further, Patent Literature 6 discloses a noise control filter that detects a seat on which a passenger is seated using sensing means and efficiently controls a noise only at that position. As means that achieves this, a load sensor installed under a seat or on a seat back as a passenger presence/absence detection sensor is used. Specifically, the load sensor discriminates a seat on which a passenger is seated from a seat on which no passenger is seated, and noise control is not performed on the seat no passenger is seated, but a finite number of actuators (speakers) that reproduce a control sound, for example, are effectively used to expand a control space in the seat on which the passenger is seated. Here, an example of the passenger presence/absence detection sensor is a charge type sensor.

Although the automobile has been described so far, seats on which passengers are seated are also installed in a train, and unlike an automobile, a plurality of seats is integrated, and can rotate.

Patent Literature 7 discloses a train seat orientation changing device that facilitates work for orienting all seats in a certain direction at the time of a turnaround operation or cleaning, thus shortening the work time. As means that achieves this, an orientation detection sensor that detects seat orientations and a reference attitude detection sensor that detects that the seats are in a reference attitude are used. Specifically, the orientation detection sensor detects rotational positions of the seats to determine whether the seats are orientated in a predetermined orientation, and the reference attitude detection sensor determines whether the seats are at an initial position (a state in which the seats are not reclined), unlocks only seats at the initial position in the predetermined orientation, and simultaneously changes the orientations of all the unlocked seats.

Conventionally, as described above, various services and values are provided to passengers being seated on seats not only in automobiles and trains but also in airplanes and the like. However, as for the sensing of a seat state including the presence or absence of passengers, a method for directly measuring a physical quantity related to a seat such as a seat position, a seat angle, a load, and a distance is commonly used, but a seat state sensing method based on an element not directly related to a seat itself has not been used.

Further, in the active noise control (ANC) of Patent Literature 5 and Patent Literature 6, although the means that detects a noise is provided, the seat position sensor, the angle sensor, the load sensor, or the like is additionally used without using the noise detection means, which increases the cost.

In order to solve such an issue, the present inventor has found that a seat state including at least one of a seat slide position, a seat reclining angle, and a seat orientation can be sensed simply and at low cost by using a similarity between vibration detected by a vibration detector installed in a seat of a vehicle and vibration detected by a vibration detector installed in a vehicle body near the seat, and has arrived at the present disclosure.

Next, each aspect of the present disclosure will be described.

A seat state sensing device according to one aspect of the present disclosure includes at least one first vibration detector that is installed in at least one seat of a vehicle, detects vibration, and outputs a first vibration signal, at least one second vibration detector that is installed in a vehicle body near the at least one seat, detects vibration, and outputs a second vibration signal, a first calculation unit that calculates a similarity between the first vibration signal input from the at least one first vibration detector and the second vibration signal input from the at least one second vibration detector, and a sensing unit that senses a seat state including at least one of a slide position of the at least one seat in a front-rear direction of the vehicle body, a reclining angle of the at least one seat, and an orientation of the at least one seat with respect to the front-rear direction of the vehicle body, based on the similarity calculated by the first calculation unit.

According to this aspect, the first calculation unit calculates the similarity between the first vibration signal input from the first vibration detector and the second vibration signal input from the second vibration detector, and the sensing unit senses the seat state based on the similarity, thus sensing the seat state of the seat installed in the vehicle simply and at low cost.

In the above aspect, the at least one second vibration detector includes a plurality of the second vibration detectors installed to be separated from each other in the front-rear direction of the vehicle body, the seat state includes the slide position of the seat in the front-rear direction of the vehicle body, the first calculation unit calculates a plurality of the similarities between the first vibration signal and a plurality of the second vibration signals input respectively from the plurality of second vibration detectors, and the sensing unit senses the slide position of the at least one seat in the front-rear direction of the vehicle body based on the plurality of similarities calculated by the first calculation unit.

According to this aspect, the plurality of second vibration detectors is installed to be separated from each other in the front-rear direction of the vehicle body, and the sensing unit sense the slide position of the seat based on the plurality of similarities, thereby improving sensing accuracy.

In the above aspect, the at least one second vibration detector includes a plurality of the second vibration detectors installed to be separated from each other in a vertical direction of the vehicle body, the seat state includes the reclining angle of the at least one seat, the first calculation unit calculates a plurality of the similarities between the first vibration signal and a plurality of the second vibration signals input respectively from the plurality of second vibration detectors, and the sensing unit senses the reclining angle of the at least one seat based on the plurality of similarities calculated by the first calculation unit.

According to this aspect, the plurality of second vibration detectors is installed to be separated from each other in the vertical direction of the vehicle body, and the sensing unit senses the reclining angle of the seat based on the plurality of similarities, thereby improving the sensing accuracy.

In the above aspect, the at least one seat includes a plurality of the seats that is installed to be connected to each other in a lateral direction of the vehicle body and has an independently adjustable reclining angle, and the at least one first vibration detector includes a plurality of the first vibration detectors installed respectively in the plurality of seats. A second calculation unit that calculates similarities between a plurality of the first vibration signals input respectively from the plurality of first vibration detectors is further provided. The sensing unit further senses a relative reclining angle between the plurality of seats based on the similarities calculated by the second calculation unit.

According to this aspect, the sensing unit can sense an absolute reclining angle of each of the plurality of seats by sensing the relative reclining angle between the plurality of seats installed to be connected in the lateral direction of the vehicle body.

In the above aspect, the at least one seat includes a plurality of the seats installed to be connected in a lateral direction of the vehicle body, the at least one first vibration detector includes a plurality of the first vibration detectors installed respectively in the plurality of seats, the seat state includes the orientations of the plurality of seats with respect to the front-rear direction of the vehicle body, the first calculation unit calculates a plurality of similarities between a plurality of the first vibration signals input respectively from the plurality of first vibration detectors and the second vibration signal input from the second vibration detector, and the sensing unit senses the orientations of the plurality of seats with respect to the front-rear direction of the vehicle body based on the plurality of similarities calculated by the first calculation unit.

According to this aspect, the plurality of first vibration detectors is installed respectively in the plurality of seats installed to be connected in the lateral direction of the vehicle body, and the sensing unit senses the orientations of the seats based on the plurality of similarities, thus improving the sensing accuracy.

In the above aspect, the at least one first vibration detector includes a plurality of the first vibration detectors installed on right and left sides of the at least one seat, the seat state includes the orientation of the at least one seat with respect to the front-rear direction of the vehicle body, the first calculation unit calculates a plurality of the similarities between a plurality of the first vibration signals input respectively from the plurality of first vibration detectors and the second vibration signal input from the second vibration detector, and the sensing unit senses the orientation of the at least one seat with respect to the front-rear direction of the vehicle body based on the plurality of similarities calculated by the first calculation unit.

According to this aspect, the plurality of first vibration detectors is installed on the left and right side of the seat, and the sensing unit senses the orientation of the seat based on the plurality of similarities, thereby improving the sensing accuracy.

In the above aspect, a signal processing unit that generates a control signal by performing predetermined signal processing on a noise signal as the second vibration signal input from the second vibration detector, based on a control coefficient, and a speaker that is installed in or near the at least one seat and outputs the control signal input from the signal processing unit are further provided.

According to this aspect, since a noise microphone included in the active noise control (ANC) can also be used as the second vibration detector, downsizing and cost reduction can be achieved.

In the above aspect, a storage unit that stores a plurality of coefficients corresponding to seat states is further provided, and the storage unit inputs a coefficient corresponding to the seat state sensed by the sensing unit among the plurality of coefficients as the control coefficient to the signal processing unit.

According to this aspect, a silencing effect produced by the active noise control can be improved by inputting the coefficient corresponding to the seat state sensed by the sensing unit to the signal processing unit as the control coefficient.

In the above aspect, an update unit that updates the control coefficient based on an error signal as the first vibration signal input from the first vibration detector is further provided.

According to this aspect, since an error microphone included in the active noise control can also be used as the first vibration detector, downsizing and cost reduction can be achieved. Further, the silencing effect produced by the active noise control can be improved by updating the control coefficient based on the error signal.

A computer-readable recording medium recording a program according to one aspect of the present disclosure for causing a computer, as a seat state sensing device that is mounted to a vehicle and includes at least one first vibration detector that is installed in at least one seat of the vehicle, detects vibration, and outputs a first vibration signal, and at least one second vibration detector that is installed in a vehicle body near the at least one seat, detects vibration, and outputs a second vibration signal, to function as first calculation means that calculates a similarity between the first vibration signal input from the at least one first vibration detector and the second vibration signal input from the at least one second vibration detector, and a sensing means that senses a seat state including at least one of a slide position of the at least one seat in a front-rear direction of the vehicle body, a reclining angle of the at least one seat, and an orientation of the at least one seat with respect to the front-rear direction of the vehicle body, based on the similarity calculated by the first calculation means.

According to this aspect, the seat state can be sensed simply and at low cost based on the similarity between the first vibration signal input from the first vibration detector and the second vibration signal input from the second vibration detector.

A seat state sensing method according to one aspect of the present disclosure for causing a seat state sensing device that is mounted to a vehicle and includes at least one first vibration detector that is installed in at least one seat of the vehicle, detects vibration, and outputs a first vibration signal, and at least one second vibration detector that is installed in a vehicle body near the at least one seat, detects vibration, and outputs a second vibration signal to perform calculating a similarity between the first vibration signal input from the at least one first vibration detector and the second vibration signal input from the at least one second vibration detector, and sensing a seat state including at least one of a slide position of the at least one seat in a front-rear direction of the vehicle body, a reclining angle of the at least one seat, and an orientation of the at least one seat with respect to the front-rear direction of the vehicle body, based on the calculated similarity.

According to this aspect, the seat state can be sensed simply and at low cost based on the similarity between the first vibration signal input from the first vibration detector and the second vibration signal input from the second vibration detector.

The present disclosure may also be implemented as a program for causing a computer to perform each characteristic function included in a device as described above, or a system that operates in accordance with the program. It is needless to say that such a computer program can be distributed using a computer-readable non-transitory recording medium such as a CD-ROM, or via a communication network such as the Internet.

EMBODIMENTS OF PRESENT DISCLOSURE

Hereinafter, embodiments of the present disclosure will be described in detail with reference to the drawings. Elements denoted by the same reference numerals in different drawings represent the same or corresponding elements.

An embodiment described below illustrates a specific preferred example of the present disclosure.

Further, in the embodiments described below, active noise control (hereinafter, abbreviated as "ANC") is described as an example of service to a passenger seated on a seat. However, the present disclosure is not limited to the active noise control, and can be provided to all services and values that can use a seat state sensed in the present disclosure, such as audio control, air conditioning control, lighting control, and airbag control.

The following embodiments describe components, placement positions of the components, connection forms, the order of operations, and the like that are merely examples and are not intended to limit the present disclosure. The present disclosure is limited only by the scope of claims.

Thus, although the components in the following embodiments include a component that is not described in an independent claim indicating the most generic concept of the present disclosure and is not necessarily required to achieve the object of the present disclosure, this component is described as a constituent configuring a more preferable form.

First Embodiment

Figure 1:
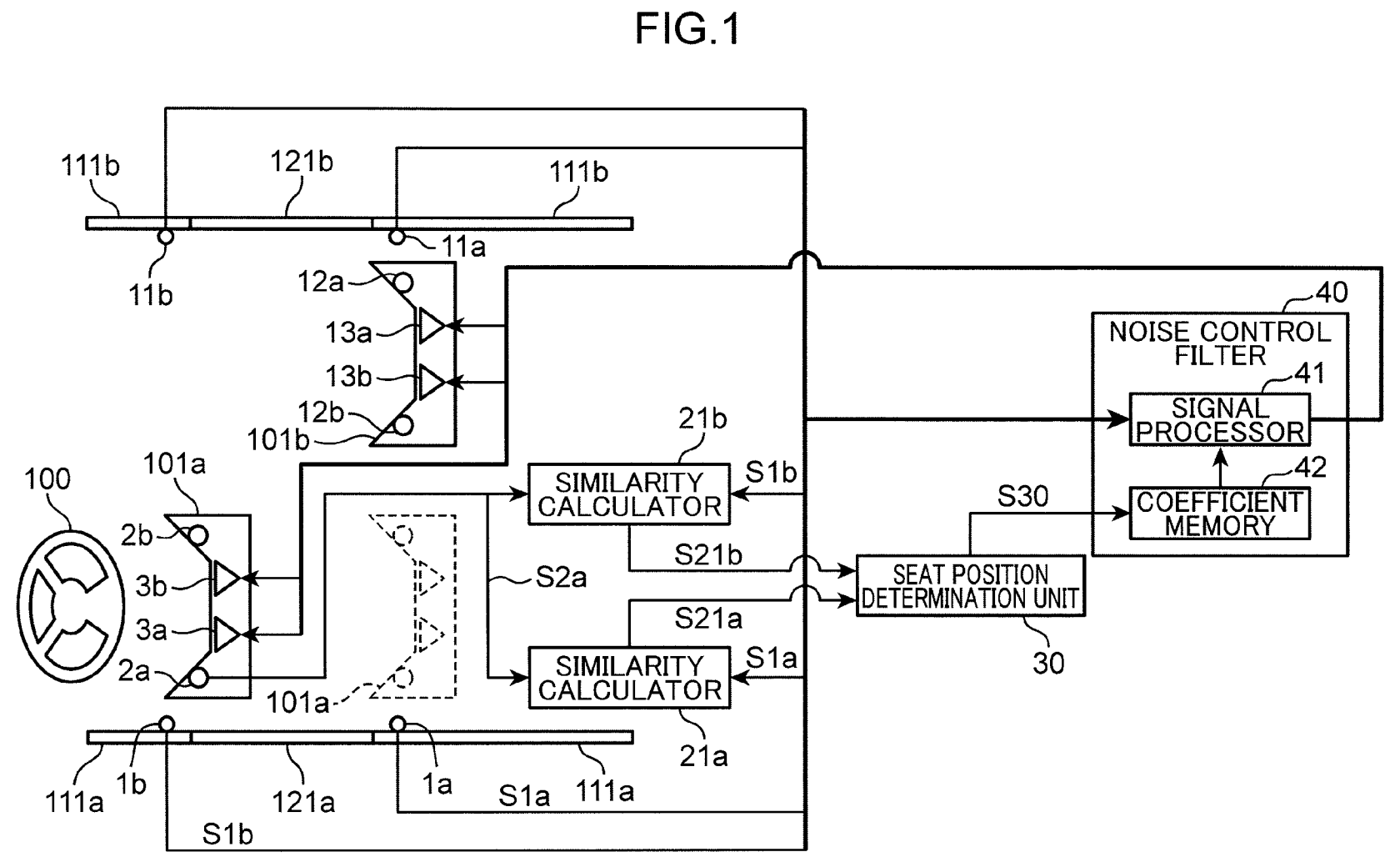

A configuration of a seat state sensing device according to a first embodiment will be described. FIG. 1 is a configuration diagram of the seat state sensing device according to the first embodiment. The seat state sensing device includes similarity calculators 21a and 21b and a seat position determination unit 30. The similarity calculators 21a and 21b and the seat position determination unit 30 may be functions implemented by a central processing unit (CPU) executing a program read from a non-volatile memory such as a read only memory (ROM), or may be implemented by dedicated hardware.

FIG. 1 exemplifies the seat state sensing device in a seat in a case where an interior of an automobile is viewed from above. Microphones 2a and 2b and speakers 3a and 3b corresponding to first vibration detectors are installed in a seat 101a that is a driver's seat having a steering wheel 100. Microphones 12a and 12b and speakers 13a and 13b corresponding to the first vibration detectors are installed in a seat 101b that is a passenger seat adjacent to the driver's seat. Further, microphones 1a and 1b corresponding to second vibration detectors are installed in a vehicle body 111a (near a window 121a of a door on the driver's seat side) of the vehicle, and microphones 11a and 11b corresponding to the second vibration detectors are installed in a vehicle body 111b (near a window 121b of a door on the passenger seat side). The microphones and the speakers are connected to a noise control filter 40 for reducing an automobile traveling noise in the vehicle interior. That is, FIG. 1 illustrates a case where the seat state sensing device is applied to ANC of an automobile traveling noise, and in this case, the seat state sensing device further includes the noise control filter 40.

Here, the microphones 1a, 1b, 11a, and 11b are noise microphones in the ANC, and the microphones 2a, 2b, 12a, and 12b are error microphones. The noise control filter 40 causes a signal processor 41 to process a noise signal indicating a traveling noise detected by the noise microphones 1a, 1b, 11a, and 11b so as to reduce noise at positions of the error microphones 2a, 2b, 12a, and 12b, and reproduce processed signals as control sound respectively from the speakers 3a, 3b, 13a, and 13b. Then, the traveling noise and the control sound interfere with each other at the positions of the error microphones 2a, 2b, 12a, and 12b, and the error microphones 2a, 2b, 12a, and 12b detect residual error signals (hereinafter, referred to as error signals). Normally, the noise control filter 40 uses adaptive signal processing to update its own control coefficient so as to minimize this error signals. The error signals are minimized by repeating this calculation, and the control coefficient for reducing the traveling noise is obtained. The control coefficient thus obtained is stored in a coefficient memory 42.

A more detailed description will be given with reference to FIG. 2. FIG. 2 illustrates the inside of the noise control filter 40 of FIG. 1.

In FIG. 2, the noise signals detected by the noise microphones 1a, 1b, 11a, and 11b are subject to signal processing with the control coefficient in the signal processor 41 by the signal processor 41, and are output as control signals respectively to the speakers 3a, 3b, 13a, and 13b. At the same time, the noise signals detected by the noise microphones 1a, 1b, 11a, and 11b are subject to signal processing together with a coefficient in a transmission characteristic corrector 43 by the transmission characteristic corrector 43.

Here, in the transmission characteristic corrector 43, transmission characteristics between the speakers 3a, 3b, 13a, and 13b and the error microphones 2a, 2b, 12a, and 12b are preset as coefficients. The setting of the coefficient is executed by selecting an appropriate coefficient (a coefficient obtained when the seat 101a is located at a position indicated by a solid line) from a plurality of coefficients stored in advance in the coefficient memory 42 in accordance with the seat position determined (sensed) by the seat position determination unit 30 (sensing unit) described later.

The coefficient thus set and the noise signals detected by the noise microphones 1a, 1b, 11a, and 11b are subject to signal processing by the transmission characteristic corrector 43, and the processed outputs are input to the coefficient update unit 44.

The coefficient update unit 44 uses the output signals from the transmission characteristic corrector 43 and the error signals from the error microphones 2a, 2b, 12a, and 12b to update the control coefficient of the signal processor 41 so as to minimize the error signals through the adaptive signal processing. Then, the error signals are minimized, and the control coefficient for reducing the traveling noise is obtained by sequentially repeating this adaptive signal processing.

The control coefficient thus obtained is finally stored in the coefficient memory 42.

As illustrated in FIG. 3, actually a large number of noise microphones are used, such as microphones 1a to 1f, in addition to the microphones 1a, 1b, 11a, and 11b illustrated in FIG. 1. For example, the microphone 1a and 1b are installed to be separated from each other in the front-rear direction of the vehicle body, and the microphones 1a and 1c are installed to be separated from each other in the vertical direction of the vehicle body. FIG. 3 illustrates the vicinity of the window 121a of the door when the seat 101a is viewed from the side, and naturally, microphones are similarly installed also in the window 121b of the door on the passenger seat side. All the microphones are used in the noise control filter 40.

The microphones 1a to 1f are installed in the vehicle body 111a near the seat 101a. In the example of the present embodiment, "near" means that the microphone 2a and the microphones 1a and 1b are close to the extent that identical vibration (traveling noise) can be detected. In FIG. 3, the microphones 1b, 1d, and 1f are installed on a front portion of the vehicle, and the microphones 1a, 1c, and 1e are installed behind the microphones 1b, 1d, and 1f, respectively. These microphones are disposed so that the seat 101a moves forward and backward to approach the microphones on either side.

How the seat state sensing device acts on the noise control filter 40 will be described below by taking the seat 101a in FIG. 1 as an example.

In FIG. 1, it is assumed that the seat 101a is initially at a position indicated by a dotted line, and is currently moved to a position indicated by a solid line (direction approaching the steering wheel 100). At this time, the microphone 2a in the seat 101a is closest to the microphone 1b installed in the vehicle body 111a. The same applies to FIG. 3. Therefore, a traveling noise during the traveling of the automobile is detected by the microphone 2a and also detected by the microphone 1b at the same time. Thereafter, the similarity calculator 21b calculates a similarity between two signals (noise signals S2a and S1b). The similarity calculator 21b outputs a signal S21b indicating the similarity between the noise signals S2a and S1b, and the signal S21b is input to the seat position determination unit 30. As a specific example, for example, cross correlation or coherence of two signals may be obtained.

An Expression (1) represents a cross correlation function where, for example, x(t) represents a signal detected by the microphone 1b and y(t) represents a signal detected by the microphone 2a. The similarity between these two signals can be obtained. In a case where the similarity is low, Rxy(τ) approaches 0. Conversely, in a case where the similarity is high, the value of Rxy(τ) increases.

[Formula 1]

$$R_{xy}(\tau) = \lim_{T \to \infty} \frac{1}{T} \int_0^T x(t)y(t + \tau)dt \tag{1}$$

On the other hand, Formula (2) represents a coherence function. Similarly, when x(t) indicates a signal detected by the microphone 1b and y(t) indicates a signal detected by the microphone 2a, Wxy represents a cross spectrum of x(t) and y(t), Wxx represents a power spectrum of x(t), Wyy represents a power spectrum of y(t). A coherence function $\gamma^2$ represents a value obtained by dividing a square of an absolute value of an average cross spectrum by an average power spectrum of each of x(t) and y(t). If the similarity between the two signals x(t) and y(t) is low, $\gamma^2$ has a small value (approaching 0), and if the similarity is high, $\gamma^2$ has a large value (approaching 1). Here, the coherence function has a value for each frequency for frequency analysis.

[Formula 2]

$$\gamma^2 = \frac{W_{xy} \cdot W_{xy}^*}{W_{xx} \cdot W_{yy}} = \frac{|W_{xy}|^2}{W_{xx} \cdot W_{yy}} \tag{2}$$

Note that the similarity calculation is not limited to cross correlation or coherence, and distance between vectors may be obtained when two signals, such as a Euclidean distance and a Mahalanobis distance, are regarded as the vectors. Alternatively, the distance may be obtained using a power spectrum after frequency analysis such as a cepstrum distance as a vector.

As described above, the similarity calculator 21b obtains the similarity between the microphones 1b and 2a on the seat 101a indicated by the solid line.

Similarly, the microphone 1a detects the traveling noise in a case where the seat 101a is at the position indicated by the solid line (that is, at present), and the microphone 2a also detects the traveling noise at the same time. The similarity calculator 21a then calculates the similarity between the two signals (noise signals S2a and Sla). The similarity calculator 21a outputs a signal S21a indicating the similarity between the noise signals S2a and Sla, and the signal S21a is input to the seat position determination unit 30. At this time, since the microphones 1a and 2a are separated from each other, the similarity therebetween is naturally smaller than the similarity obtained by the microphones 1b and 2a.

That is, when the seat position determination unit 30 compares the similarity obtained by the similarity calculator 21a and the similarity calculated by the similarity calculator 21b, it is found that the output signal from the similarity calculator 21b is greater. As a result, the seat position determination unit 30 determines that the seat 101a is moved to the current position indicated by the solid line, that is, near the steering wheel 100. However, the seat position determination unit 30 does not necessarily compare the two similarities obtained by the similarity calculator 21a and the similarity calculator 21b, and may determine the slide position of the seat 101a based only on the similarity obtained by one of the similarity calculators 21a and 21b.

Then, an appropriate coefficient (a coefficient obtained when the seat 101a is at the position indicated by the solid line) is selected from the coefficients stored in the coefficient memory 42 of the noise control filter 40, in accordance with the result (signal S30) determined by the seat position determination unit 30, and is set in the signal processor 41. Then, in the seat 101a, a satisfactory traveling noise reduction effect can be obtained.

Meanwhile, the seat 101a can freely be moved to an intermediate position or the like other than the positions indicated by the solid line and a dotted line. In this case, if the similarity between the microphones 2a and 1a and the similarity between the microphones 2a and 1b at each position are stored for each position, the position at the present time can be determined by confirming which similarity among the stored similarities is closest to the similarity calculated at the present time.

Note that, although the seat 101a has been described as an example in the present embodiment, a satisfactory noise reduction effect can be similarly obtained also in the seat 101b by seat position sensing using the microphones 12a, 11a, and 11b.

In the present embodiment, the case where the seat position sensing is applied to the noise control filter 40 has been described. The signal for similarity calculation is used common with the signals for noise control, that is, the signals detected by the microphones 1a, 1b, 11a, 11b, 2a, and 12a. This makes an additional sensor for detecting a traveling noise unnecessary, which can contribute to downsizing and cost reduction of the device.

Further, in the present embodiment, the two microphones 2a and 2b or two microphones 12a and 12b are installed in one seat such as the driver's seat and the passenger seat, and this is for obtaining an effect at least on both ears of a seated passenger like the ANC. For example, in the case of optimally controlling air conditioning and lighting for each passenger, only one microphone 2a or microphone 12a may be installed in one seat.

Further, in the present embodiment, a microphone is used as the noise detector, but the present disclosure is not limited thereto, and any sensor, such as an acceleration sensor or a vibration sensor, capable of detecting a signal related to traveling vibration such as a traveling noise may be used.

In the present embodiment, the speakers 3a, 3b, 13a, and 13b are installed near the headrest of the seat. However, the present disclosure is not limited to this configuration, and the speakers may be installed inside the vehicle such as the vehicle bodies 111a and 111b.

Furthermore, in the present embodiment, the automobile has been described as an example, but the present disclosure is not limited thereto and may be applied to an aircraft, a train, and the like.

Second Embodiment

Figure 4:
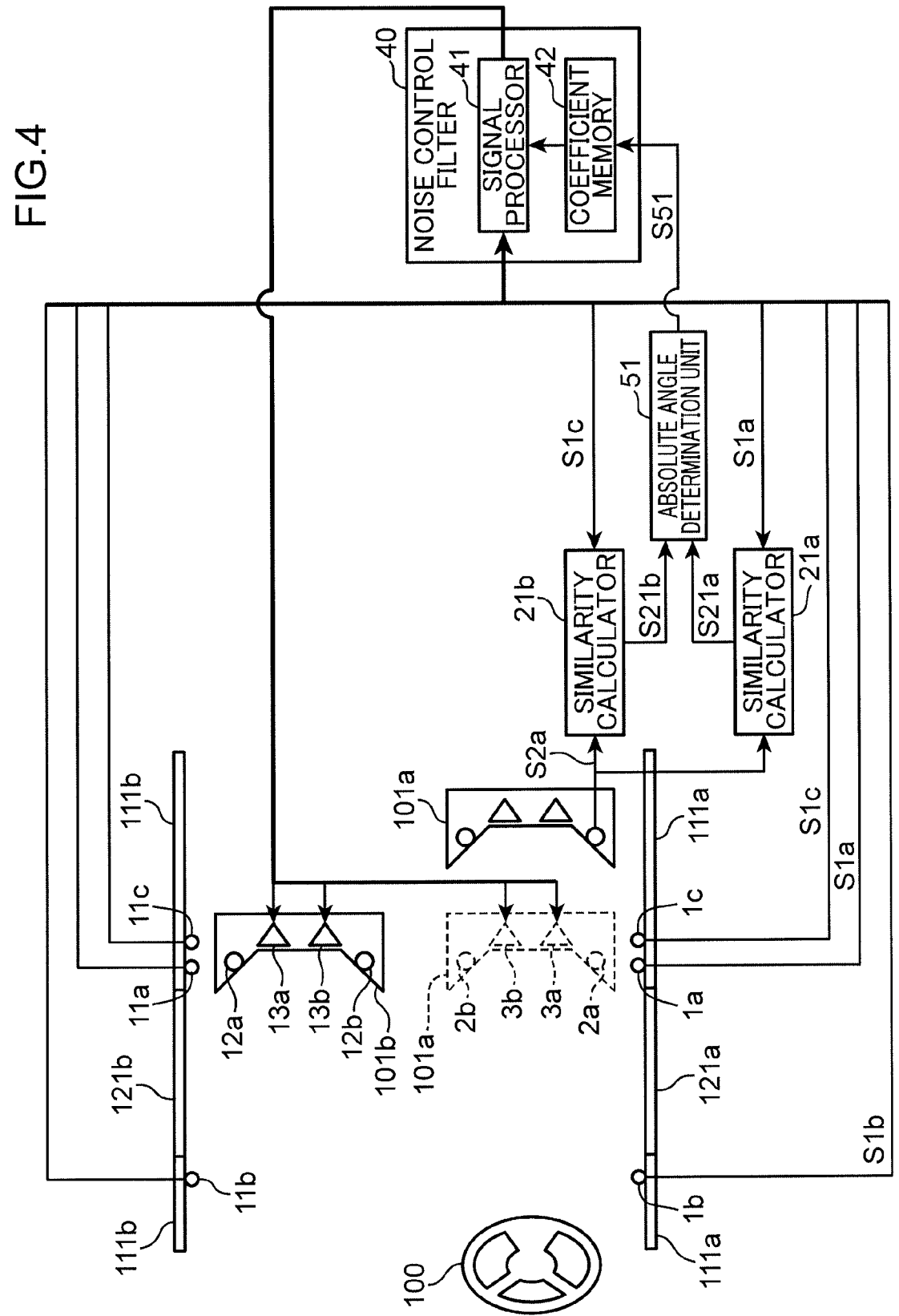
FIG. 4 is a configuration diagram of a seat state sensing device according to a second embodiment.

A configuration of a seat state sensing device according to a second embodiment will be described. FIG. 4 illustrates the configuration of the seat state sensing device according to the second embodiment. The seat state sensing device includes similarity calculators 21a and 21b and an absolute angle determination unit 51. The similarity calculators 21a and 21b and the absolute angle determination unit 51 may be functions implemented by a CPU executing a program read from a non-volatile memory such as a ROM, or may be implemented by dedicated hardware.

As in FIG. 1, FIG. 4 exemplifies the seat state sensing device in a seat in a case where the interior of the automobile is viewed from above. Although the seat position sensing has been described with reference to FIG. 1, the detection of a seat reclining angle will be described with reference to FIG. 4.

In FIG. 4, it is assumed that a seat 101a is initially at a position indicated by a dotted line, and is currently at a position indicated by a solid line after reclining adjustment. Since the reclining angle is difficult to understand in FIG. 4, the reclining angle is supplemented using FIG. 5.

Figure 5:
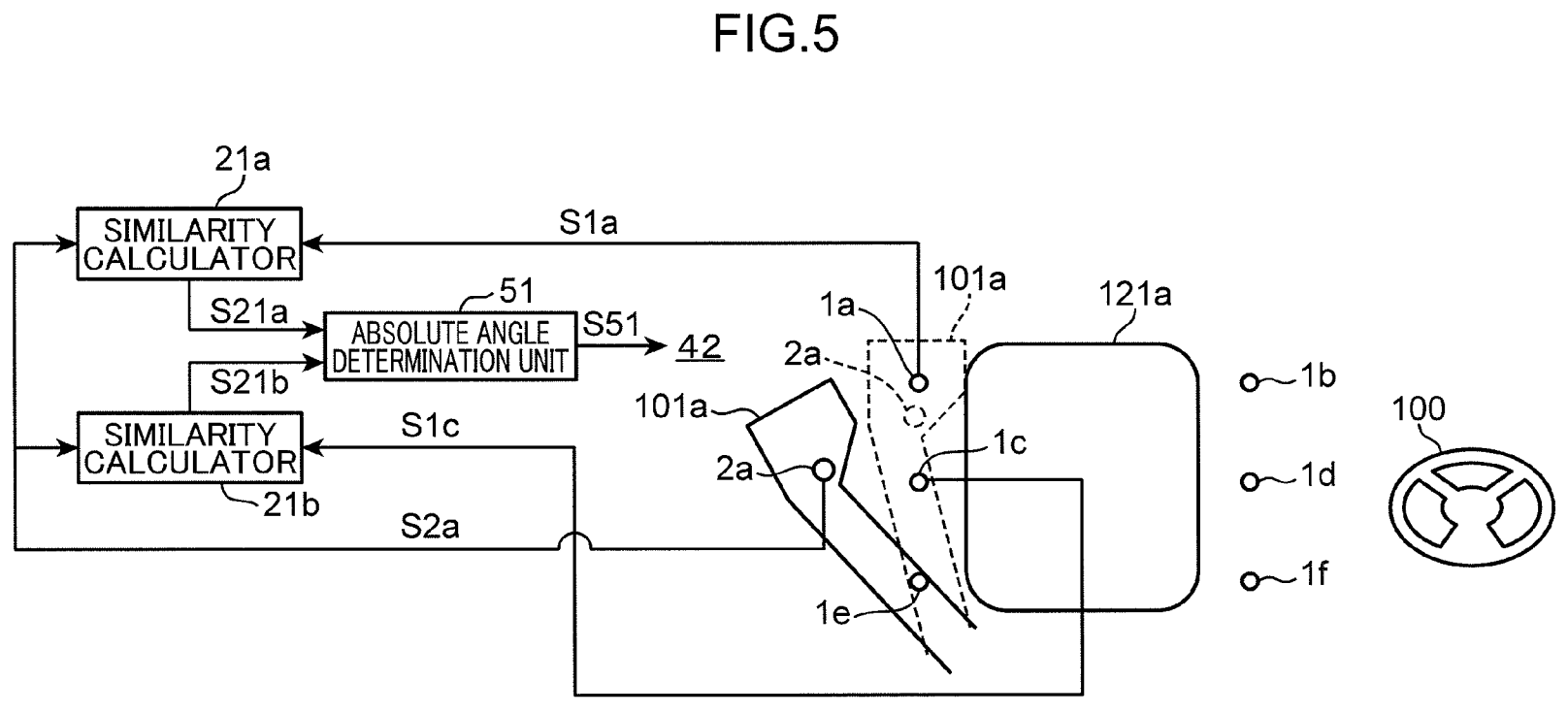

In FIG. 5, microphones 1a to if are installed in a front-rear direction of the vehicle as in FIG. 3, but it should be further noted that the microphones 1a, 1c, and 1e are disposed in a vertical direction, and similarly, the microphones 1b, 1d, and if are also disposed in the vertical direction.

In FIG. 5, it can be seen that the seat 101a is reclined from the initial position indicated by the dotted line to the current position indicated by the solid line. At this time, the microphone 2a in the seat 101a is initially closest to the microphone 1a installed in the vehicle body 111a, but the position of the microphone 2a is lowered by reclining, and is thus currently close to the microphone 1c.

Therefore, as in the case of FIG. 1, in the current reclining state (the state of the seat 101a indicated by the solid line), the microphone 2a detects a traveling noise during the traveling of the automobile, and the microphone 1a also detects the traveling noise at the same time. Thereafter, the similarity calculator 21a calculates a similarity between the two signals (noise signals S2a and S1a). As for the similarity, cross correlation, coherence, or the like between the two signals may be obtained.

At the same time, the microphones 2a and 1c detect a traveling noise, and the similarity calculator 21b calculates a similarity between the two signals (noise signals S2a and S1c).

Then, the absolute angle determination unit 51 (sensing unit) compares the similarity obtained by the similarity calculator 21a with the similarity obtained by the similarity calculator 21b, and it is found that the output signal from similarity calculator 21b is greater at present. As a result, the absolute angle determination unit 51 determines that the seat 101a is at the current position indicated by the solid line, that is, a reclined position. However, the absolute angle determination unit 51 does not necessarily compare the two similarities obtained respectively by the similarity calculator 21a and the similarity calculator 21b, and may determine the reclining angle of the seat 101a based simply on the similarity obtained by one of the similarity calculators 21a and 21b.

Then, an appropriate coefficient (a coefficient obtained when the seat 101a is at the position indicated by the solid line) is selected from the coefficients stored in the coefficient memory 42 of the noise control filter 40 in accordance with the result (signal S51) determined by the absolute angle determination unit 51, and is set in a signal processor 41. Then, in the seat 101a, a satisfactory traveling noise reduction effect can be obtained.

Incidentally, the reclining angle of the seat 101a can be freely adjusted to an intermediate position and the like other than the position indicated by the solid line and the position indicated by the dotted line. In this case, if the similarity between the microphones 2a and 1a and the similarity between the microphones 2a and 1c at each reclining angle are stored for each angle, the reclining angle at the present time can be determined by confirming which similarity among the stored similarities is closest to the similarity calculated at the present time.

Here, it is naturally conceivable to make the reclining adjustment when the seat 101a is at the position (direction close to the steering wheel) indicated by the solid line in FIG. 1. At this time, the microphones 1a and 1c are not necessarily close to the microphone 2a. On the contrary, the microphone 1b or the microphone 1d may be closer. Therefore, it is preferable to calculate the similarities of the microphone 2a with respect to all the microphones 1a to if in FIG. 3, and determine the slide position and the reclining angle of the seat 101a in accordance with which microphone among the microphones 1a to 1f and the microphone 2a have the highest similarity.

Note that, although the seat 101a has been described as an example in the present embodiment, a satisfactory noise reduction effect can be similarly obtained also in the seat 101b by the seat position sensing using the microphones 12a, 11a, and 11c.

In the present embodiment, the case where the sensing of the reclining angle is applied to the noise control filter 40 has been described. A signal for similarity calculation is used in common with signals for noise control, that is, signals detected by the microphones 1a, 1c, 11a, 11c, 2a, and 12a. This makes an additional sensor for detecting a traveling noise unnecessary, which can contribute to downsizing and cost reduction of the device.

Further, in the present embodiment, the two microphones 2a and 2b or two microphones 12a and 12b are installed in one seat such as the driver's seat and the passenger seat, and this is for obtaining an effect at least on both ears of a seated passenger like the ANC. For example, in the case of optimally controlling air conditioning and lighting for each passenger, only one microphone 2a or microphone 12a may be installed in one seat.

Further, in the present embodiment, a microphone is used as the noise detector, but the present disclosure is not limited thereto, and any sensor, such as an acceleration sensor or a vibration sensor, capable of detecting a signal related to traveling vibration such as a traveling noise may be used.

In the present embodiment, the speakers 3a, 3b, 13a, and 13b are installed near the headrest of the seat. However, the present disclosure is not limited to this configuration, and the speakers may be installed inside the vehicle such as the vehicle bodies 111a and 111b.

Furthermore, in the present embodiment, the automobile has been described as an example, but the present disclosure is not limited thereto and may be applied to an aircraft, a train, and the like.

Therefore, a case of a train is assumed and described with reference to FIGS. 6 and 7.

Figure 6:
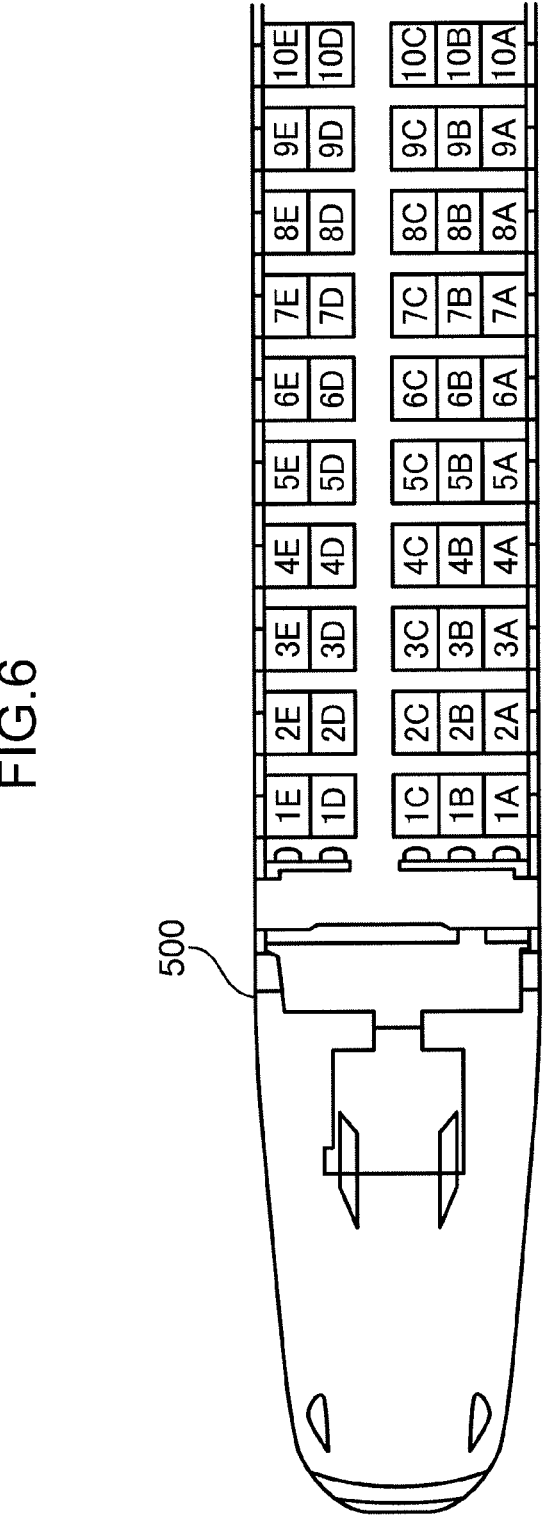
FIG. 6 is a view illustrating a seat arrangement in a case where the inside of a train is viewed from above.

FIG. 6 exemplifies seats in a case where the inside of a train 500 is viewed from above. As described above, the seats of the train 500 usually have a seat configuration where two seats or three seats are integrated, such as seats 1D and 1E, and seats 1A, 1B and 1C. These seats are arranged in one row across an aisle, and a plurality of the rows (10 rows in FIG. 6) are set. A reclining angle of each seat can be independently adjusted. That is, the vehicle of the train 500 includes a plurality of seats that is installed to be connected in a left-right direction of the vehicle body and has an independently adjustable reclining angle.

Figure 7:
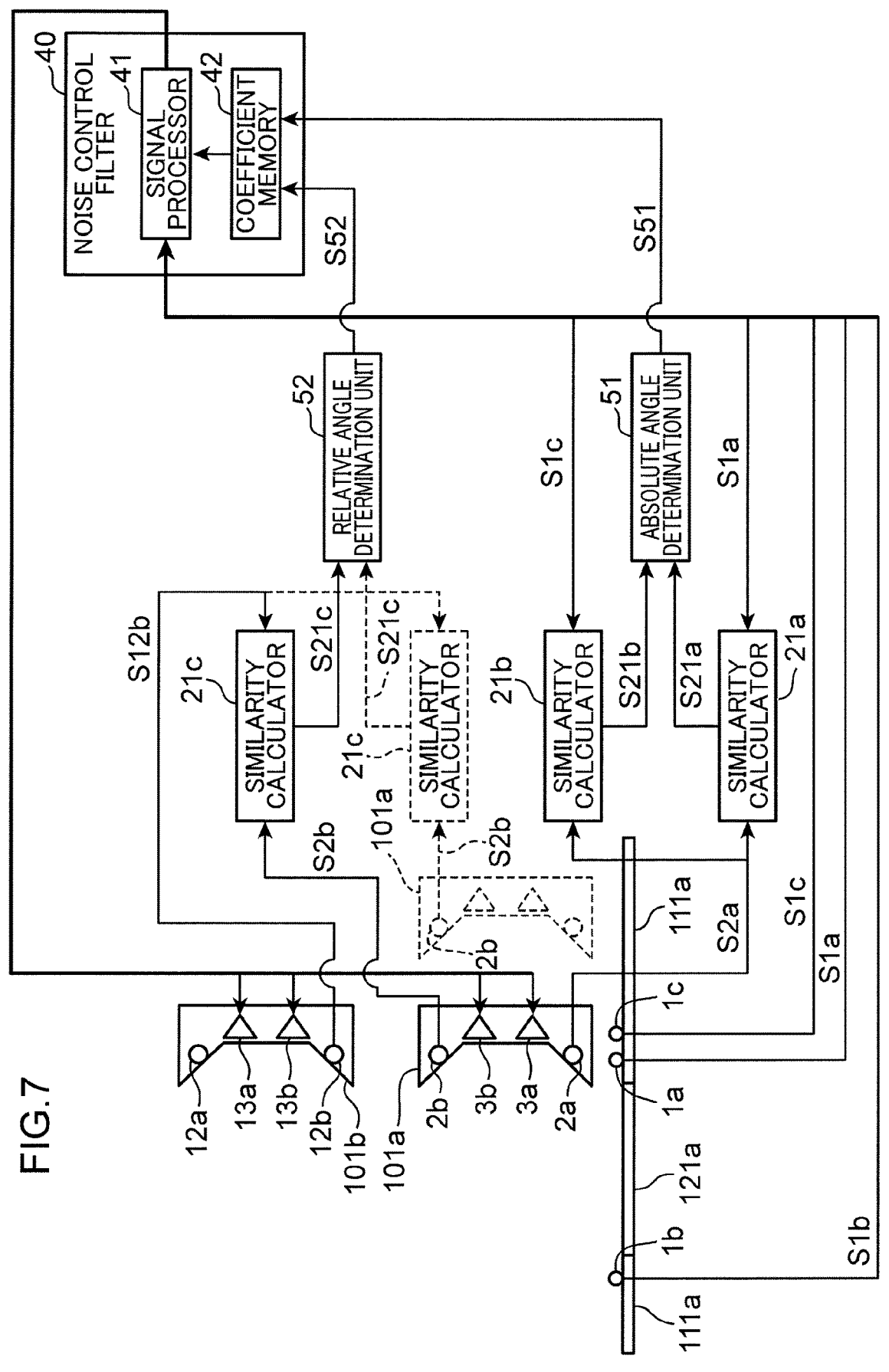
FIG. 7 is a configuration diagram of the seat state sensing device according to the second embodiment.

FIG. 7 is a configuration diagram of the seat state sensing device of the vehicle of the train 500. In FIG. 7, the seats 101a 101b have an integrated configuration, and the seat 101a has the microphones 2b (first vibration detector) and the seat 101b has the microphone 12b (first vibration detector). In the current seat position indicated by a solid line, the microphones 2b and 12b are close to each other. The seat state sensing device includes the similarity calculators 21a to 21c, the absolute angle determination unit 51 that senses an absolute reclining angle of the seat 101a, and a relative angle determination unit 52 that senses a relative reclining angle of the seat 101b with respect to the seat 101a. The similarity calculators 21a and 21b, the absolute angle determination unit 51, and the relative angle determination unit 52 may be functions implemented by a CPU executing a program read from a non-volatile memory such as a ROM, or may be implemented by dedicated hardware.

On the other hand, if the seat 101a is initially reclined to a position indicated by a dotted line, the microphones 2b and 12b at this time are separated from each other.

Therefore, the similarity calculator 21e (second calculator) calculates the similarity between the traveling noises (noise signals S2b and S12b) detected respectively by the microphones 2b and 12b at each reclining angle. The relative angle determination unit 52 compares the similarity between the initial reclining state indicated by the dotted line and the current reclining state indicated by the solid line (signal S21c in each state). The relative angle determination unit 52 determines that the reclining state indicated by the solid line having great similarity is the current reclining position.

However, the relative angle determination unit 52 merely determines the relative reclining states of the seats 101a and 101b, and for example, in a case where both the seats have the reclining angle identical to the reclining angle of the seat 101a indicated by the dotted line, the relative angle determination unit 52 outputs the result identical to the current reclining state indicated by the solid line. That is, in this state, the reclining angle is not obtained.

Therefore, as for the seat 101a, as in the case of FIG. 4, the reclining angle of the seat 101a with respect to the vehicle body 111a (or the window 121a) is compared using the similarity between the microphones 1a and 2a installed in the vehicle body 111a (vehicle panel or the like) of the train and the similarity between the microphones 1c and 2a installed in the vehicle body 111a, and the absolute angle determination unit 51 determines the reclining angle of the seat 101a using the compared reclining angle as the absolute angle. Then, an actual reclining angle (absolute angle) of the seat 101*b* is determined by the relative angle determination unit 52 obtaining the relative angle of the seat 101*b* with respect to the seat 101*a*.

Thereafter, an appropriate coefficient is selected from the coefficients stored in the coefficient memory 42 of the noise control filter 40 in accordance with the results (signals S51 and S52) determined respectively by the absolute angle determination unit 51 and the relative angle determination unit 52, and is set in the signal processor 41. Then, in the seats 101*a* and 101*b*, the satisfactory traveling noise reduction effect can be obtained.

In the present embodiment, the case where the sensing of the reclining angle is applied to the noise control filter 40 has been described. A signal for the similarly calculation is used in common with signals for noise control, that is, signals detected by the microphones 1*a*, 1*c*, 2*a*, and 12*a*. This makes an additional sensor for detecting a traveling noise unnecessary, which can contribute to downsizing and cost reduction of the device.

Further, in the present embodiment, the two microphones 2*a* and 2*b* or the two microphones 12*a* and 12*b* are installed in one seat, and this is for obtaining an effect at least on both ears of a seated passenger like the ANC. For example, in the case of optimally controlling air conditioning and lighting for each passenger, only one microphone 2*a* or microphone 12*a* may be installed in one seat.

Further, in the present embodiment, a microphone is used as the noise detector, but the present disclosure is not limited thereto, and any sensor, such as an acceleration sensor or a vibration sensor, capable of detecting a signal related to traveling vibration such as a traveling noise may be used.

In the present embodiment, the speakers 3*a*, 3*b*, 13*a*, and 13*b* are installed near the headrest of the seat. However, the present disclosure is not limited to this configuration, and the speakers may be installed inside the vehicle such as the vehicle body 111*a*.

Furthermore, in the present embodiment, the train has been described as an example, but the present disclosure is not limited thereto, and may be applied to a configuration, such as an aircraft, where a plurality of seats is integrated to be adjacent to each other.

Third Embodiment

Figure 8:
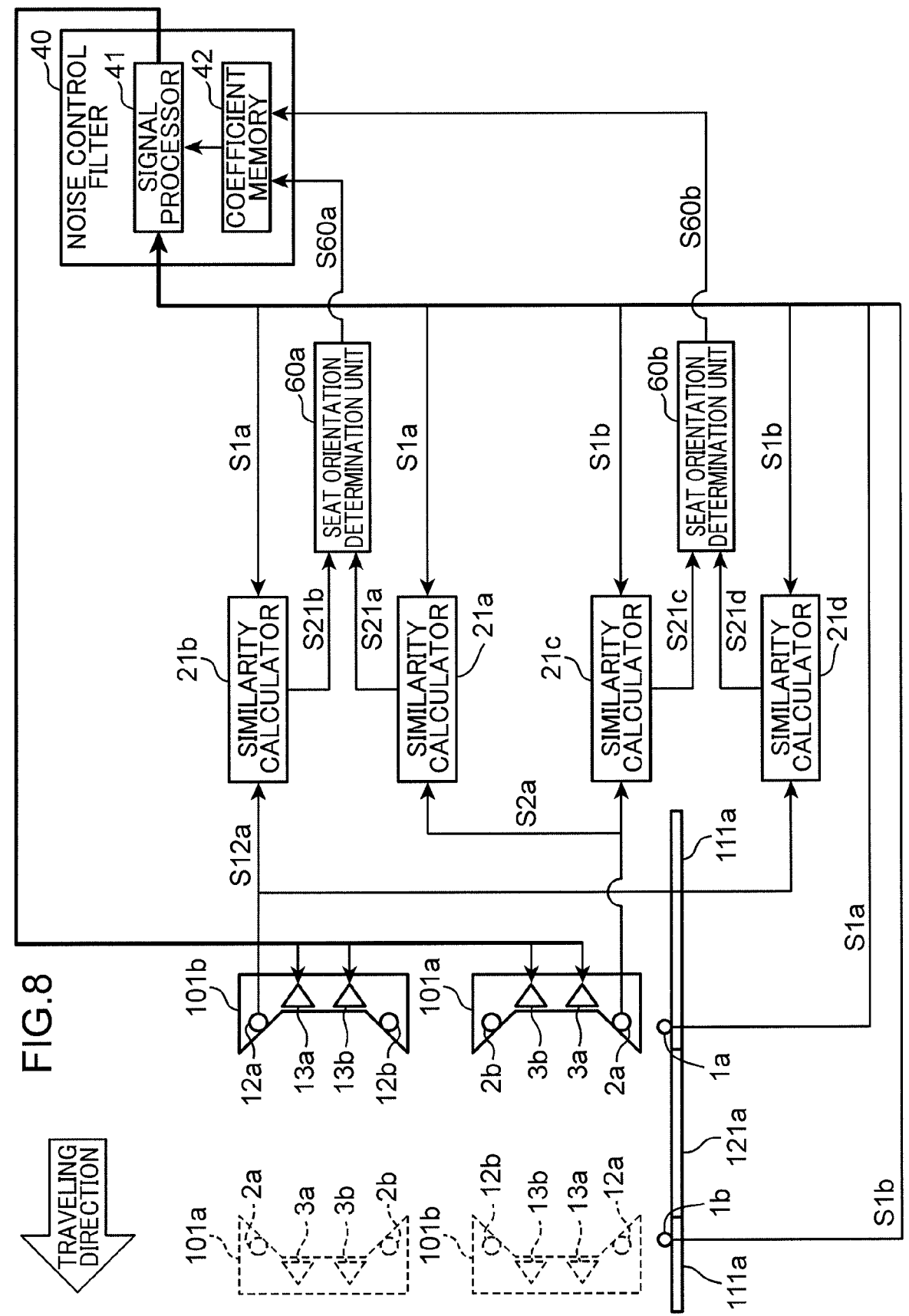
FIG. 8 is a configuration diagram of a seat state sensing device according to a third embodiment.

A configuration of a seat state sensing device according to a third embodiment will be described. FIG. 8 illustrates the configuration of the seat state sensing device according to the third embodiment. The seat state sensing device includes similarity calculators 21*a* to 21*d* and seat orientation determination units 60*a* and 60*b*. The similarity calculators 21*a* to 21*d* and the seat orientation determination units 60*a* and 60*b* may be functions implemented by a CPU executing a program read from a non-volatile memory such as a ROM, or may be implemented by dedicated hardware.

As in FIG. 7, FIG. 8 exemplifies the seat state sensing device in seats in a case where an interior of the train is viewed from above. The sensing of the reclining angle has been described with reference to FIG. 7, but the sensing of the orientation of the seat (seat orientation) with respect to the front-rear direction of the vehicle body will be described with reference to FIG. 8.

Unlike the automobile or the aircraft in which an orientation of a seat is fixed on a front (steering wheel or cockpit) side, a train has a structure where a traveling direction of a vehicle is changed and the seat is rotated in response to the change of the traveling direction due to an operation method with which the train reciprocates on a track. Normally, the seat orientation is adjusted so as to face the traveling direction of the train. However, for example, in a case of a group of four passengers, the seat orientation may be made opposite to the traveling direction to cause the two sets of seats to face each other.

In FIG. 8, it is assumed that currently integrated seats 101*a* and 101*b* are at positions indicated by solid lines in the current traveling direction. This is indicated by a solid line in FIG. 9 when viewed from the side of the interior. Note that FIG. 9 illustrates a seat close to the window side on purpose (although not illustrated in FIG. 9, the seat 101*b* indicated by a solid line naturally exists in front of the seat 101*a* indicated by a solid line).

Figure 9:
FIG. 9 is a side view of a seat.
Figure 9:
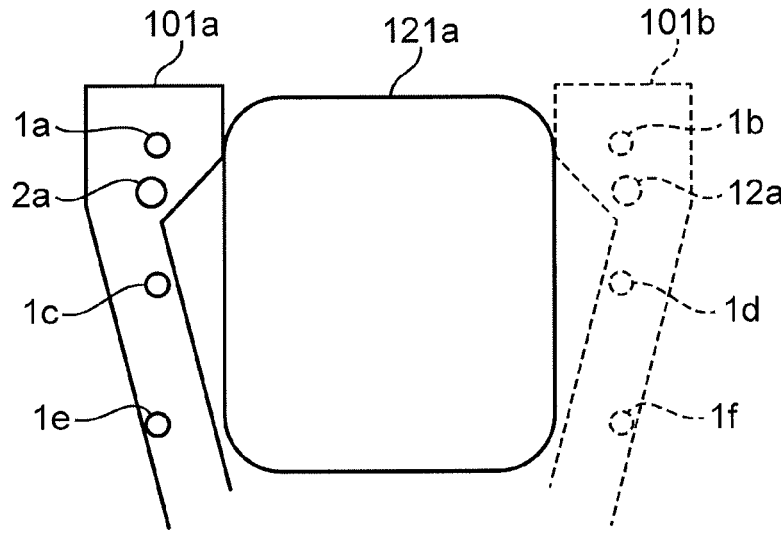

In FIG. 9, the microphones 1*a* to 1*f* are disposed in the front-rear direction of the vehicle, but it can also be said that they are disposed symmetrically with respect to the window 121*a* when viewed from the seat rotation.

As can be seen from FIG. 9, the microphone 2*a* in the seat 101*a* is closest to the microphone 1*a* installed in the vehicle body 111*a* of the train.

On the other hand, the microphone 12*a* in seat 101*b* at this time is distant from the microphone 1*a* as can be seen from FIG. 8.

Therefore, in the current seat orientation (the state indicated by the solid line), the microphone 2*a* detects a traveling noise during the traveling of the train, and the microphone 1*a* also detects the traveling noise at the same time. The similarity calculator 21*a* calculates a similarity between the two signals (noise signals S2*a* and S1*a*). As for the similarity, cross correlation, coherence, or the like between the two signals may be obtained.

At the same time, the microphones 12*a* and 1*a* detect a traveling noise, and the similarity calculator 21*b* calculates a similarity between the two signals (noise signals S12*a* and S1*a*).

The seat orientation determination unit 60*a* (detection unit) compares the similarity obtained by the similarity calculator 21*a* with the similarity obtained by the similarity calculator 21*b*, and then it is found that the output from the similarity calculator 21*a* is greater. As a result, the seat orientation determination unit 60*a* determines that the seats 101*a* and 101*b* are in the current seat orientation indicated by the solid line. However, the seat orientation determination unit 60*a* does not necessarily compare the two similarities obtained respectively by the similarity calculators 21*a* and 21*b*, and may determine the orientations of the seats 101*a* and 101*b* based simply on the similarity obtained by one of the similarity calculators 21*a* and 21*b*.

On the other hand, the similarity calculator 21*c* calculates the similarity between the noise signal S2*a* from the microphone 2*a* and the noise signal S1*b* from the microphone 1*b*, and the similarity calculator 21*d* calculates the similarity between the noise signal S12*a* from the microphone 12*a* and the noise signal S1*b* from the microphone 1*b*. However, both the similarities are low because the microphones are distant from each other. As a result, the seat orientation determination units 60*a* and 60*b* determine that the microphones 2*a* and 1*a* are closest to each other, and can determine the seat orientation indicated by the solid line.

Then, an appropriate coefficient (coefficient obtained when the seats 101*a* and 101*b* are at the position indicated by the solid line) is selected from the coefficients stored in the coefficient memory 42 of the noise control filter 40 in accordance with the results (signals S60*a* and S60*b*) determined by the seat orientation determination units 60*a* and 60b, and is set in the signal processor 41. In the seats 101a and 101b, the satisfactory traveling noise reduction effect can be obtained.

In a case where the seats 101a and 101b are rotated, a state indicated by a dotted line is obtained. In this case, the microphones 12a and 1b are closest to each other. That is, since the similarity calculated by the similarity calculator 21d is the highest, the seat orientation determination units 60a and 60b can determine a state indicated by the dotted line.

Accordingly, an appropriate coefficient (coefficient obtained when the seats 101a and 101b are at the position indicated by the dotted line) is selected from the coefficients stored in the coefficient memory 42 of the noise control filter 40 even if the seats 101a and 101b are rotated, and is set in the signal processor 41. Thus, the satisfactory traveling noise reduction effect can be obtained in the seats 101a and 101b.

Figure 10:
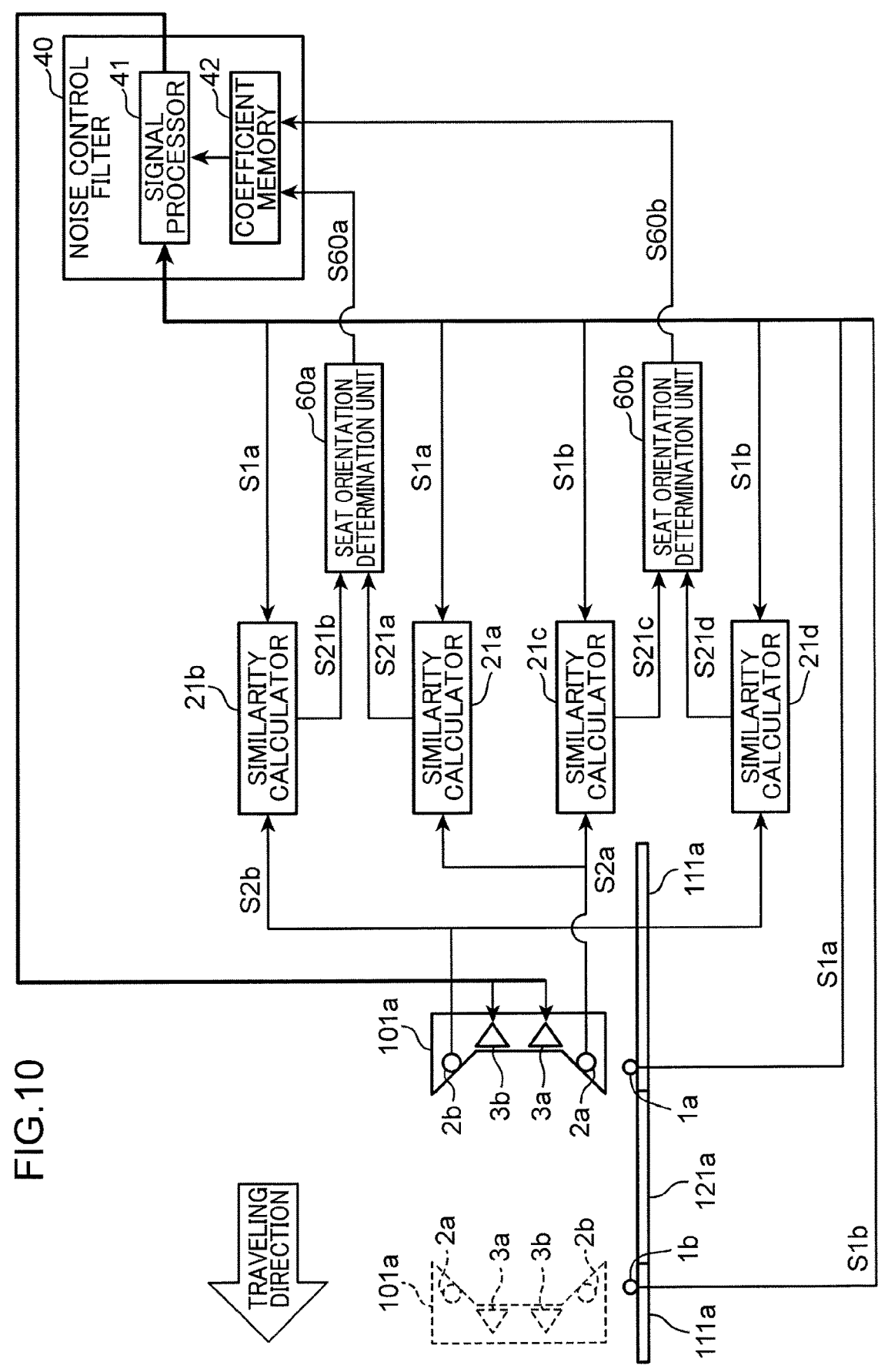
FIG. 10 is a configuration diagram of the seat state sensing device according to the third embodiment.

Although the integrated seats 101a and 101b have been described as an example in FIG. 8, only one seat may be disposed in a Green car (first-class car), and this is illustrated in FIG. 10.

In FIG. 10, the seat 101a is installed near the window 121a. It is assumed that the seat 101a in the current traveling direction is at a position indicated by a solid line. The microphone 2a in the seat 101a at this time is close to the microphone 1a installed in the vehicle body 111a and is distant from the microphone 1b. On the other hand, the microphone 2b in the seat 101a is distant from both the microphones 1a and 1b.

Therefore, in the current seat orientation (the state indicated by the solid line), the microphone 2a detects a traveling noise during the traveling of the train, and the microphone 1a also detects the traveling noise at the same time. The similarity calculator 21a calculates a similarity between the two signals (noise signals S2a and S1a). As for the similarity, cross correlation, coherence, or the like between the two signals may be obtained.

At the same time, the microphones 2b and 1a detect a traveling noise, and the similarity calculator 21b calculates a similarity between the two signals (noise signals S2b and S1a).

The seat orientation determination unit 60a (detection unit) compares the similarity obtained by the similarity calculator 21a with the similarity obtained by the similarity calculator 21b, and then it is found that the output from the similarity calculator 21a is greater.

On the other hand, the similarity calculator 21c calculates the similarity between the noise signal S2a from the microphone 2a and the noise signal S1b from the microphone 1b, and the similarity calculator 21d calculates the similarity between the noise signal S2b from the microphone 2b and the noise signal S1b from the microphone 1b. However, both the similarities are low because the microphones are distant from each other. As a result, the similarity from the similarity calculator 21a is maximum.

Accordingly, the seat orientation determination units 60a and 60b determine that the seat 101a is in the current seat orientation indicated by the solid line. An appropriate coefficient (coefficient obtained when the seat 101a is at the position indicated by the solid line) is selected from the coefficients stored in the coefficient memory 42 of the noise control filter 40 in accordance with the results (signals S60a and S60b) determined by the seat orientation determination units 60a and 60b, and is set in the signal processor 41. Then, in the seat 101a, a satisfactory traveling noise reduction effect can be obtained.

In a case where the seat 101a is rotated, a state indicated by the dotted line is obtained. In this case, the microphones 2b and 1b are closest to each other. On the other hand, the microphone 2a is distant from both the microphones 1b and 1a. That is, since the similarity calculated by the similarity calculator 21d is the highest among the similarities calculated by the similarity calculators 21a to 21d, the seat orientation determination units 60a and 60b can determine the seat orientation is as indicated by the dotted line.

Accordingly, an appropriate coefficient (coefficient obtained when the seat 101a is at the position indicated by the dotted line) is selected from the coefficients stored in the coefficient memory 42 of the noise control filter 40 even if the seat 101a is rotated, and is set in the signal processor 41. Thus, the satisfactory traveling noise reduction effect can be obtained in the seat 101a.

Note that in the present embodiment in FIGS. 8 and 10, the case where the sensing of the seat orientation is applied to the noise control filter 40 has been described. A signal for similarity calculation is used in common with signals for noise control, that is, signals detected by the microphones 1a, 1b, 2a, and 12a. This makes an additional sensor for detecting a traveling noise unnecessary, which can contribute to downsizing and cost reduction of the device.

Further, in the present embodiment, the two microphones 2a and 2b or the two microphones 12a and 12b are installed in one seat, and this is for obtaining an effect at least on both ears of a seated passenger like the ANC. For example, in the case of optimally controlling air conditioning and lighting for each passenger, only one microphone 2a or microphone 12a may be installed in one seat.

Further, in the present embodiment, the description has been given as to the seat state where the seat is not reclined, but naturally the seat orientation can be similarly sensed also in a case where the seat is reclined.

For example, in a case where the seat 101a is reclined as illustrated in FIG. 7, the microphones 2a and 1c are in the closest state, and thus the similarity calculator may use the output signal from the microphone 1c. Here, as is clear from FIG. 9, since the microphone 1a is installed in the same side (left side of the window in FIG. 9) as the microphone 1c with respect to the window 121a, it is found that the microphone 1a is closer to the microphone 2a than the microphones 1b, 1d, and 1f installed on the opposed side. Therefore, even if the microphone 1c is not used and the signal from the microphone 2a is used as it is, the highest similarity is calculated as compared with the signals from the microphones installed on the opposed side. Thus, the seat orientation can be correctly sensed.

Further, in the present embodiment, a microphone is used as the noise detector, but the present disclosure is not limited thereto, and any sensor, such as an acceleration sensor or a vibration sensor, capable of detecting a signal related to traveling vibration such as a traveling noise may be used.

In the present embodiment, the speakers 3a, 3b, 13a, and 13b are installed near the headrest of the seat. However, the present disclosure is not limited to this configuration, and the speakers may be installed inside the vehicle such as the vehicle body 111a.

INDUSTRIAL APPLICABILITY

The present disclosure is useful, in particular, for an application to a vehicle having a seat in which at least one of a slide position in a front-rear direction of a vehicle body, a reclining angle, and an orientation with respect to the front-rear direction of the vehicle body is changeable.

REFERENCE SIGNS 1a to 1f, 2a, 2b, 12a, 12b microphone
3a, 3b, 13a, 13b speaker
21a to 21d similarity calculator
30 seat position determination unit
40 noise control filter
41 signal processor
42 coefficient memory
44 coefficient update unit
51 absolute angle determination unit
52 relative angle determination unit
60a, 60b seat orientation determination unit
101a, 101b seat

The invention claimed is:

1. A seat state sensing device comprising:
   at least one first vibration detector that is installed in at least one seat of a vehicle, detects vibration, and outputs a first vibration signal;
   at least one second vibration detector that is installed in a vehicle body near the at least one seat, detects vibration, and outputs a second vibration signal;
   a first calculation unit that calculates a similarity between the first vibration signal input from the at least one first vibration detector and the second vibration signal input from the at least one second vibration detector; and
   a sensing unit that senses a seat state including at least one of a slide position of the at least one seat in a front-rear direction of the vehicle body, a reclining angle of the at least one seat, and an orientation of the at least one seat with respect to the front-rear direction of the vehicle body, based on the similarity calculated by the first calculation unit.

2. The seat state sensing device according to claim 1,
   wherein the at least one second vibration detector includes a plurality of the second vibration detectors installed to be separated from each other in the front-rear direction of the vehicle body,
   wherein the seat state includes the slide position of the at least one seat in the front-rear direction of the vehicle body,
   wherein the first calculation unit calculates a plurality of similarities between the first vibration signal and a plurality of the second vibration signals input respectively from the plurality of second vibration detectors, and
   wherein the sensing unit senses the slide position of the at least one seat in the front-rear direction of the vehicle body based on the plurality of similarities calculated by the first calculation unit.

3. The seat state sensing device according to claim 1,
   wherein the at least one second vibration detector includes a plurality of the second vibration detectors installed to be separated from each other in a vertical direction of the vehicle body,
   wherein the seat state includes the reclining angle of the at least one seat,
   wherein the first calculation unit calculates a plurality of similarities between the first vibration signal and a plurality of the second vibration signals input respectively from the plurality of second vibration detectors, and wherein the sensing unit senses the reclining angle of the at least one seat based on the plurality of similarities calculated by the first calculation unit.

4. The seat state sensing device according to claim 3,
   wherein the at least one seat includes a plurality of seats that are installed to be connected to each other in a lateral direction of the vehicle body and have independently adjustable reclining angles,
   wherein the at least one first vibration detector includes a plurality of the first vibration detectors installed respectively in the plurality of seats, the seat state sensing device further comprising:
   a second calculation unit that calculates similarities between a plurality of the first vibration signals input respectively from the plurality of first vibration detectors,
   wherein the sensing unit further senses a relative reclining angle between the plurality of seats based on the similarities calculated by the second calculation unit.

5. The seat state sensing device according to claim 1,
   wherein the at least one seat includes a plurality of the seats installed to be connected in a lateral direction of the vehicle body,
   wherein the at least one first vibration detector includes a plurality of the first vibration detectors installed respectively in the plurality of seats,
   wherein the seat state includes orientations of the plurality of seats with respect to the front-rear direction of the vehicle body,
   wherein the first calculation unit calculates a plurality of the similarities between a plurality of the first vibration signals input respectively from the plurality of first vibration detectors and the second vibration signal input from the second vibration detector, and
   wherein the sensing unit senses the orientations of the plurality of seats with respect to the front-rear direction of the vehicle body based on the plurality of similarities calculated by the first calculation unit.

6. The seat state sensing device according to claim 1,
   wherein the at least one first vibration detector includes a plurality of the first vibration detectors installed in a lateral direction of the at least one seat,
   wherein the seat state includes the orientation of the at least one seat with respect to the front-rear direction of the vehicle body,
   wherein the first calculation unit calculates a plurality of similarities between a plurality of the first vibration signals input respectively from the plurality of first vibration detectors and the second vibration signal input from the second vibration detector, and
   wherein the sensing unit senses the orientation of the at least one seat with respect to the front-rear direction of the vehicle body based on the plurality of similarities calculated by the first calculation unit.

7. The seat state sensing device according to claim 1, further comprising:
   a signal processing unit that generates a control signal by performing predetermined signal processing on a noise signal as the second vibration signal input from the at least one second vibration detector, based on a control coefficient; and
   a speaker that is installed in or near the at least one seat and outputs the control signal input from the signal processing unit.

8. The seat state sensing device according to claim 7, further comprising:

a storage unit that stores a plurality of coefficients corresponding to seat states, wherein the storage unit inputs a coefficient corresponding to the seat state sensed by the sensing unit among the plurality of coefficients as the control coefficient to the signal processing unit.

9. The seat state sensing device according to claim 7, further comprising an update unit that updates the control coefficient based on an error signal as the first vibration signal input from the at least one first vibration detector.

10. A computer-readable recording medium recording a program for causing a computer, as a seat state sensing device that is mounted to a vehicle and includes at least one first vibration detector that is installed in at least one seat of the vehicle, detects vibration, and outputs a first vibration signal, and at least one second vibration detector that is installed in a vehicle body near the at least one seat, detects vibration, and outputs a second vibration signal, to:

calculate a similarity between the first vibration signal input from the at least one first vibration detector and the second vibration signal input from the at least one second vibration detector, and sense a seat state including at least one of a slide position of the at least one seat in a front-rear direction of the vehicle body, a reclining angle of the at least one seat, and an orientation of the at least one seat with respect to the front-rear direction of the vehicle body, based on the similarity.

11. A seat state sensing method for causing a seat state sensing device that is mounted to a vehicle and includes at least one first vibration detector that is installed in at least one seat of the vehicle, detects vibration, and outputs a first vibration signal, and at least one second vibration detector that is installed in a vehicle body near the at least one seat, detects vibration, and outputs a second vibration signal, to perform:

calculating a similarity between the first vibration signal input from the at least one first vibration detector and the second vibration signal input from the at least one second vibration detector; and sensing a seat state including at least one of a slide position of the at least one seat in a front-rear direction of the vehicle body, a reclining angle of the at least one seat, and an orientation of the at least one seat with respect to the front-rear direction of the vehicle body, based on the calculated similarity.

* * * * *